United States Patent [19]
Landowski

[11] Patent Number: 6,124,889
[45] Date of Patent: Sep. 26, 2000

[54] PROGRAMMABLE VIDEO TIMING GENERATOR SCANNING AN EVENT MEMORY BETWEEN POSSIBLE EVENT TIMES

[75] Inventor: Roger W. Landowski, Waukesha, Wis.

[73] Assignee: Cognex Technology and Investment Corporation, Mountain View, Calif.

[21] Appl. No.: 08/921,993

[22] Filed: Aug. 27, 1997

[51] Int. Cl.[7] .................................................. H04N 3/14
[52] U.S. Cl. ............................ 348/312; 348/61; 348/91; 348/92; 348/222
[58] Field of Search .................................. 348/61, 86, 91, 348/92, 93, 94, 222, 311, 312; 382/141, 103; 358/443, 444, 404; 377/20, 16, 57, 129

[56] References Cited

U.S. PATENT DOCUMENTS

| | | |
|---|---|---|
| 4,860,096 | 8/1989 | Long et al. ............................... 348/61 |
| 4,885,784 | 12/1989 | Miyagawa et al. ....................... 382/141 |
| 4,896,211 | 1/1990 | Hunt et al. ............................... 348/132 |
| 5,457,490 | 10/1995 | Doane ........................................ 348/95 |
| 5,808,744 | 9/1998 | Moriya ..................................... 382/145 |
| 5,911,003 | 6/1999 | Sones ....................................... 382/141 |

*Primary Examiner*—Wendy Garber
*Assistant Examiner*—Mitchell White
*Attorney, Agent, or Firm*—Keith M. Baxter; John M. Miller; John J. Horn

[57] ABSTRACT

A video timing generator provides control and timing signals for a variety of different camera types by employing a circular buffer scanned rapidly before the occurrence of each potential control and timing signal. The circular buffer holds operation codes for generating the control and timing signal linked to target event signal times. An operation code having a target event signal time matching with the next event time is decoded and queued to be executed at that event time.

10 Claims, 2 Drawing Sheets

PROGRAMMABLE VIDEO TIMING GENERATOR SCANNING AN EVENT MEMORY BETWEEN POSSIBLE EVENT TIMES

CROSS-REFERENCE TO RELATED APPLICATIONS

STATEMENT REGARDING FEDERALLY SPONSORED RESEARCH OR DEVELOPMENT

BACKGROUND OF THE INVENTION

Video cameras find use in industrial control systems where they are used for inspection of products and the monitoring of processes. Electrical signals from the video camera, typically employing a charge coupled device ("CCD") as the imaging element, are digitized and stored in a computer memory to be processed by image processing techniques well known in the art to provide control signals useful in controlling and monitoring the process.

The high data transfer rates required by image acquisition necessitates specialized image acquisition circuitry. This circuitry operates independently of the industrial processor to coordinate digitizing and storing the video data from the camera by providing various control and timing signals. Such control and timing signals may include vertical and horizontal drive signals ("VD" and "HD", respectively). As is understood in the art, the VD and HD signals are used to synchronize the acquisition of the lines of video data as they are transmitted between the camera and the acquisition circuitry. The acquisition circuitry may also provide signals to the associated video processing equipment indicating when the acquired data is valid and to a strobe light to synchronize the operation of a strobe light with the camera's acquisition of a given frame of data. Further, for cameras which can be reset, in order to begin acquisition immediately rather than at the start of a continuous scan, the acquisition circuitry may provide various control and timing signals to initialize the video camera prior to data transfer.

Desirably, the acquisition circuitry may work with a variety of different cameras from different manufacturers. Generally, such cameras require different timing and control signals occurring at different times in the acquisition of data. Specialized, high speed acquisition circuitry is typically limited in its operation to working with a limited set of video camera types. Simple, high speed operation is obtained at the cost of little programmability.

In order to provide greater flexibility in the generation of timing and control signals for different video cameras, it is known to use a large memory for the storage of such timing and control signals. During image acquisition, the data of the memory is read-out on a continuous basis. Bits are set in the memory to correspond to times when control and timing signals should be generated. Thus, by the proper programming of the memory (i.e., setting and resetting of selected memory bits), an arbitrary set of timing and control signals may be developed. Because the generation of the control and timing signals simply requires a reading of the memory, it is extremely fast, matching the speed requirements of modern video systems. Further, such an approach allows control signal transitions to occur at single pixel resolution.

One drawback to using a continuously scanned memory to create timing and control signals is that for cameras with high resolution and multiple timing and control signals, extremely large and costly memories are required. Changing the camera configuration, which may require rewriting the entire memory, is time consuming.

BRIEF SUMMARY OF THE INVENTION

The present invention provides a fully programmable timing generator for video systems that substantially reduces the amount of memory required. The present inventor has recognized that most cameras only employ a relatively limited total number of control and timing signals per acquisition. Further, these control and timing signals occur at a limited number of well defined "event times" (i.e., the ends or middles of video lines) that occur at a much lower rate than the actual rate of video transfer. Accordingly, the present inventor has realized that it is possible to search in-between event times through a small list of timing and control signals linked to particular event times to determine whether any timing or control signals are scheduled at the next event time. Thus, complete flexibility in programming is obtained in a circuit structure having limited memory usage.

Specifically, the present invention provides a video timing generator for video cameras requiring control and timing signals at event times. The timing generator includes a count generator producing a sequence of current count values at event times. An event memory holds operation codes associated with target count values and a scanning circuit which scans through the event memory in between event times to read-out the target count values. A comparator receiving the read-out target count values compares them to the current count values and, when they match, causes a decoder to execute associated operation codes.

Thus, it is one object of the invention to provide a high degree of flexibility in producing control and timing signals without requiring huge memories for storing the signals as was previously required. The event memory is fully programmable to provide control and timing signals at arbitrary event times, yet by storing target count values together with associated operation codes which generate the control and timing signals, the event memory may be compact allowing it to be fully scanned between event times.

The count generator may be synchronized to the acquisition of video data from the video camera and may have a frequency that is a first quotient of a clock signal synchronized to the acquisition of video data where the frequency of the scan clock is a second quotient of the clock signal.

Thus, it is another object of the invention to ensure the control and timing signals are precisely synchronized to the video acquisition and that the scanning of the event memory is concluded prior to each event time. Generally, the second quotient must be less than or equal to the first quotient times the number of entries in the event memory.

The decoder may execute the selected operation code at the next succeeding event time after the comparator indicates the read-out target count value is equal to the current count value.

Thus, it is another object of the invention to synchronize the control and timing signals with the event times regardless of the ordering of operation codes and target counts in the event memory.

The decoder may execute at least one operation code by presetting the count generator to a predetermined count value.

Thus, it is another object of the invention to allow for "looping" sequences of control and timing signals.

The count generator may accept a restart signal to reset the count generator to zero.

Thus, it is another object of the invention to allow the "looping" sequence to be interrupted in order to reset and initialize the camera to begin an immediate acquisition.

The decoder may execute at least one operation code by providing a control and timing signal having a duration equal to a period between successive event times or may assert or de-assert a timing and control signal at predetermined event times.

Thus, it is another object of the invention to permit a variety of control and timing signals with a small and efficient set of operation codes.

The foregoing and other objects and advantages of the invention will appear from the following description. In this description, reference is made to the accompanying drawings which form a part hereof and in which there is shown by way of illustration a preferred embodiment of the invention. Such embodiment does not necessarily represent the full scope of the invention, however and reference must be made therefore to the claims for interpreting the scope of the invention.

DETAILED DESCRIPTION OF THE INVENTION

Figure 1:
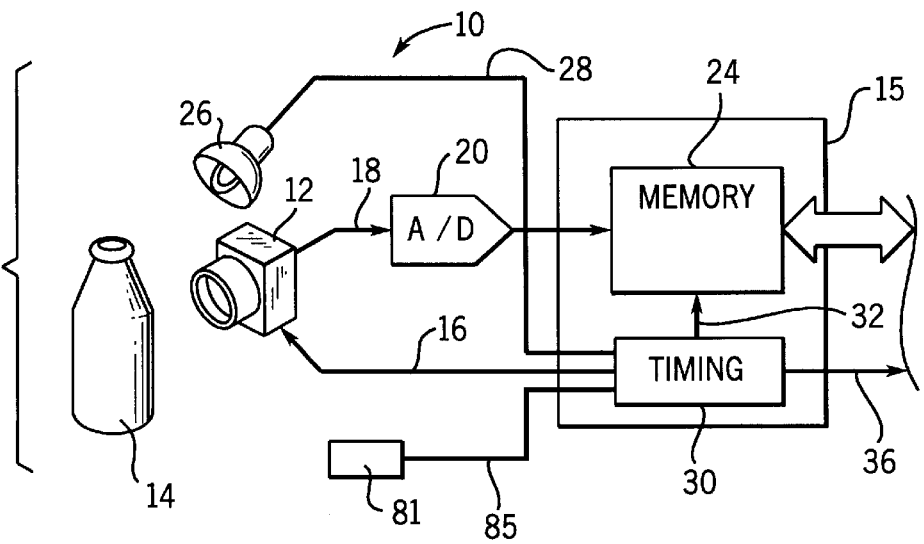
FIG. 1 is a simplified perspective view of a machine vision system together with an acquisition circuit of which the video timing generator of the present invention is a part.

Referring now to FIG. 1, a machine vision system 10 for use with an industrial controller or the like (not shown) includes a CCD camera 12 for obtaining an image of an imaged object 14. The video data 18 from the camera 12 is acquired and stored by an acquisition circuit 15 which includes memory 24 and a timing circuit 30 as will be described.

The video data 18 is obtained in response to control and timing signals 16 provided by the timing circuit 30 to the camera 12. The video data 18 from the camera 12 is then received by an analog to digital (A/D) converter 20 and converted to binary words of data stored in memory 24.

A strobe light 26 may be used in conjunction with camera 12 to illuminate the imaged object 14 upon receipt of a strobe signal 28 also generated by the timing circuit 30. A restart signal 85 may be provided by an external source, such as an industrial controller, or a position sensor 81, in order to initiate an alternative timing sequence in the timing circuit 30. This timing sequence will begin an immediate image acquisition rather than waiting for the current scan to complete, as will be described further below.

The timing circuit 30 also provides memory control signals 32 to the memory 24 to coordinate the memories acquisition of data from the camera 12 by the A/D converter 20. The timing circuit 30 may also generate various control and timing signals 36 for the benefit of the attached industrial controller.

Figure 2:
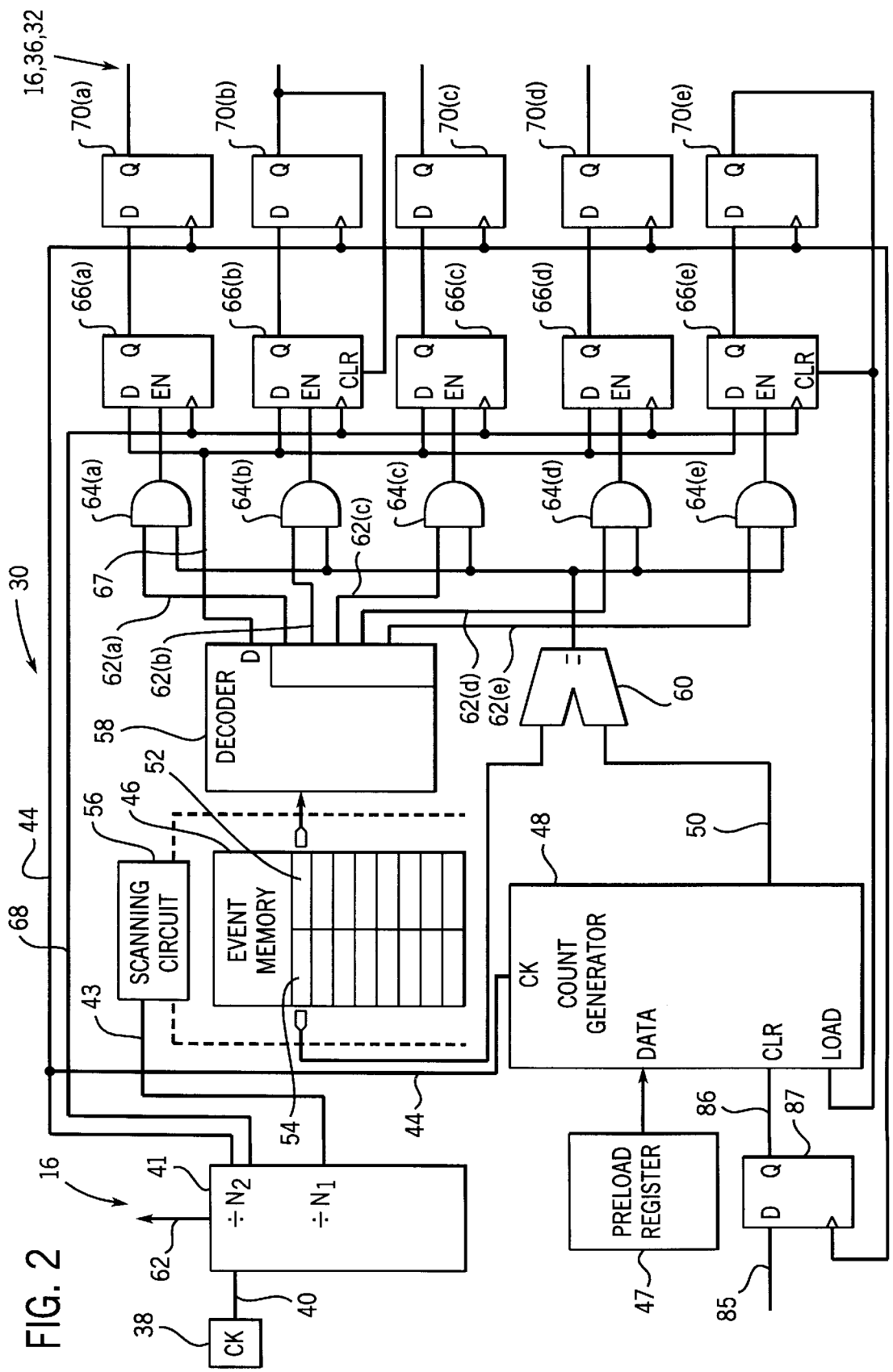
FIG. 2 is a schematic representation of the timing generator of FIG. 1.

Referring now to FIG. 2, the timing circuit 30 of the present invention includes a high speed clock 38 of conventional design providing an undivided clock signal 40 to a state machine 41 which provides various internal clocking signals as will be described. State machines 41 are well known in the art and may be constructed from a description of the control and timing signals to be provided below. Principally, the state machine 41 produces an event time signal 44 having an up-transition at all possible event times as synchronized with the acquisition of video data 18 from the camera 12. Specifically, event times occur at the conclusion of each line of video data received from camera 12 and at mid points in the acquisition of those lines. The state machine 41 also produces a scan clock 43, whose purpose will be described below, having a higher frequency than the event time signal 44 by an integral multiple. The frequencies of the event time signal 44 and the scan clock 43 may be considered to be integer quotients of the higher speed clock signal 40 from which they are derived.

The present inventor has determined that for the vast majority of cameras 12 on the market, control and timing signals 16, 32 and 36 will only occur at the up-transitions of the event time signal 44 as described. Even so, for a typical camera having two hundred and forty-eight horizontal lines, this creates up to four hundred and ninety-six possible times at which control and timing signals may be required.

The present invention provides a completely programmable timing circuit 30 allowing control and timing signals to be generated at any of these times with an event memory 46 having a substantially smaller size. Typically the event memory will have as few as sixty four storage elements, but as depicted for clarity in FIG. 2, has only sixteen storage elements.

As represented graphically, the storage elements of the event memory 46 are arranged as two columns of eight rows. Each row links a target count 54, stored in a first storage element of the row, with an operation code 52 stored in a second storage element of the row. The target count 54 for a row indicates a desired time of occurrence of the timing and control signal represented by the operation code 52 for the row. The event memory 46 is programmed by a user such that the target count value is one less than the event time at which the control and timing signal represented by the operation code 52 should occur.

A scanning circuit 56 receives the scan clock 43 from the state machine 41 and causes a scanning through the event memory 46 in which operation code 52 for successive entries are provided to a decoder 58 and target counts 54 are provided to one input of a comparator 60. The scanning circuit scans through the event memory 46 at a much faster rate than the event time signal 44 so as to complete one scan in between each event time signal 44. Thus, referring also to FIG. 4, in the eight row event memory 46 depicted in FIG. 2, the scan clock 43 will have a frequency of at least eight times that of the event time signal 44. The event memory 46 is a circular buffer so that once the final row of the event memory 46 has been read, the first row is read again and so forth.

As the event memory 46 is cycled through by the scanning circuit 56 and the operation codes forwarded to the decoder 58, the decoder 58 interprets a three bit binary number of the operation code 52 (in this example) and asserts one of five lines.

Thus, for example operation code '000' causes a logic high signal on line 62(a), operation code '001' causes a logic high signal on line 62(b) and so forth with operation code 100 providing logic high signal on line 62(e).

These logic high signals are received by one input of dual input AND gates 64(a) through 64(e), respectively. The decoder 58 also produces a data value 67 (which is also derived from the operation code) and which indicate the state to which a control or timing signal 16, 32, or 36 will be driven. The data value 67 is provided to the 'D' input of D-type latches 66(*a*) through 66(*e*), respectively. As is understood in the art, a D-type latch passes the logical value of a signal on its D input to its Q output, if the latch is enabled (by a logical high at their enable input) and on the rising edge of a clock signal received at its clock input. The D-type latch may also have a clear input which, when asserted, causes the output Q to go to logical low regardless of the D input.

The latches 66(*a*) through 66(*e*) also receive outputs of AND gates 64(*a*) through 64(*e*), respectively at their enable inputs.

As mentioned above, during the scanning of the event memory by the scanning circuit 56, the target counts 54 associated with each of the operation codes 52 are provided to one input of arithmetic comparator 60 as the operation codes are provided to the decoder 58. The second input of the comparator 60 receives a current count 50 from a count generator 48 receiving the event time signal 44 and counting up-transitions of that signal. If the current count 50 equals the target count, the comparator 60 asserts its output. This output is provided to the second of the dual inputs of the AND gates 64(*a*) through 64(*e*).

Prior to the output of the comparator 60 being asserted, the decoded outputs produced by decoder 58 are blocked by their respective AND gates 64. When, however, a given row of the event memory 46 that is being scanned has a target count 54 equal to the current count 50, then the AND gates 64(*a*) through 64(*e*) pass any decoded signal from decoder 58 to their outputs and from the outputs to the enable input of the latches 66(*a*) through 66(*e*).

Figure 4:
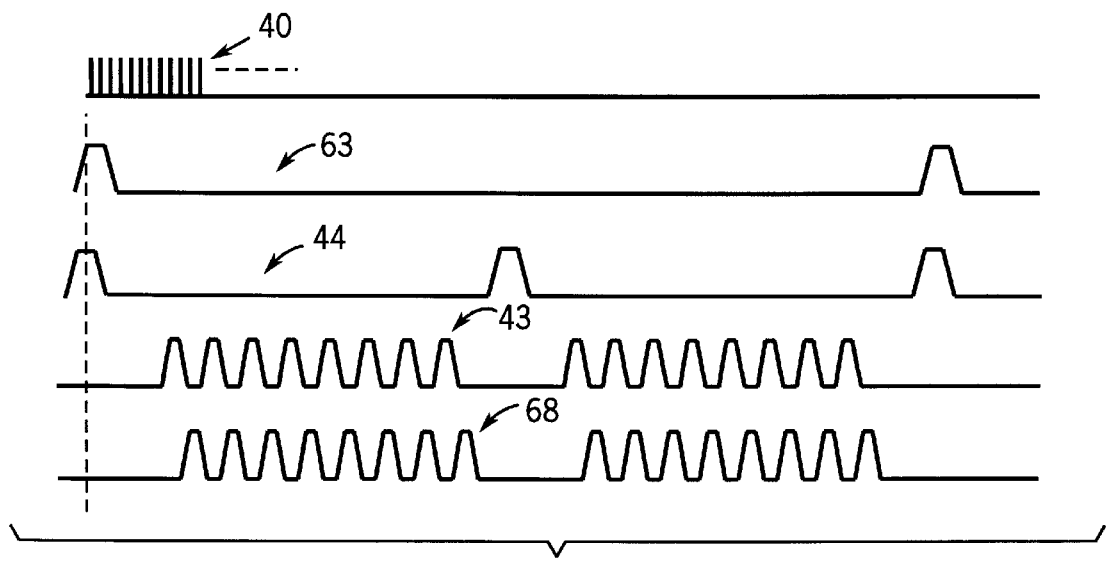
FIG. 4 is a timing diagram showing internally developed control signals used in the circuitry of FIG. 2.

Referring also to FIG. 4, a latch clock signal 68 is also generated by the state machine 41 having a rising edge corresponding to the falling edge of the scan clock 43. This latch clock signal 68 is provided to the clock inputs of the latches 66. The clock inputs are represented by a triangle.

Thus, prior to the scanning circuit 56 moving to the next row in the event memory 46, any operation code 52 corresponding to a target count value 54 equal to the current count 50 is latched and stored as an output Q in one of latches 66.

Referring now to FIG. 4, scan clock 43 completes eight cycles prior to the rising edge of the next succeeding event time signal 44. As operation code 52 may be decoded on any rising edge of the scan clock 43, latches 66 hold the decoded operation code 52 for the event time signal 44 so that it is properly synchronized with that event time. This is accomplished through the event time signal 44 being received by the clock inputs of a second set of latches 70(*a*) through 70(*e*), where the D inputs of one of those latches 70 are connected to the Q outputs of a corresponding latch 66.

Upon the next rising edge of the event time signal 44 after the complete scanning of the event memory 46, the values of the outputs of latches 66 are passed to the latches 70 whose outputs become the control and timing signals connected directly to the camera 12, memory 24, strobe 26 and control signals 36.

A number of different kinds of control and timing signals 16, 32 and 36 may be created by the timing circuit 30. Referring to latches 66(*a*) and 70(*a*), the operation code 52 may be decoded to cause control signal 62(*a*) to be asserted and the data value 67 to be a logic high. When the output of comparator 60 is asserted, a logic high will appear on the output of latch 66(*a*) and consequently latch 70(*a*).

Alternatively, operation code 52 may be decoded to cause control signal 62(*a*) to be asserted, and the data value 67 to be logic low. In this case, when the output of comparator 60 is asserted, a logic low will appear on the output of latch 66(*a*) and consequently latch 70(*a*).

In either case, the control and timing signals 16, 32, or 36 may be asserted or de-asserted at any predetermined count value 50. On the other hand, two operation codes are required to both assert, then de-assert the control or timing signal 16, 32, or 36.

For this reason, other operation codes are provided where a single operation code can both assert and de-assert the control or timing signal 16, 32, or 36. As illustrated with latches 66(*b*) and 70(*b*), the operation code may be decoded to cause control signal 62(*b*) to be asserted, and the data value 67 to be logic high. In this case, when the output of comparator 60 is asserted, a logic high will appear on the output of latch 66(*b*) and consequently latch 70(*b*). In this case, the output of latch 70(*b*) is connected to the "clear" input of latch 66(*b*) so that the output of latch 66(*b*) will be forced to return to a logic zero before the next up-transition of event time signal 44. Therefore the output of latch 70(*b*) will automatically return to logic zero at the next up-transition of event time signal 44.

Thus, with a single operation code, a control and timing signal 16, 32, and 36 can be created having a period exactly equal to the period between event times, eliminating the need for two operation codes 52, one to assert the signal and one to de-assert the signal at a subsequent time.

An operation code 52 can also be decoded to assert all the control signals 62 at once and to output a data value 67 that is logic low. This allows a single operation code 52 to de-assert all of the timing and control signals 16, 32, and 36.

A special form of operation code may be used to affect the count generator 48. For this operation code, the count generator 48 must be a loadable counter, well known in the art, accepting data from a preload register 47 which may be programmed by the user. When a load signal is received by the count generator 48, the count generator changes the current count 50 to that preload register value and continues counting from that value.

Referring to latches 66(*e*) and 70(*e*), a pulse output is produced that is connected to the load input of the count generator 48 to load the contents of the preload register into the count generator.

The count generator 48 must also accept a clear signal which causes the current count value 50 to be reset to zero. When a restart signal 85 is asserted, latch 87 will cause counter clear signal 86 to be asserted at the next up-transition of event time signal 44 forcing the count generator 48 to be reset to zero.

Figure 3:
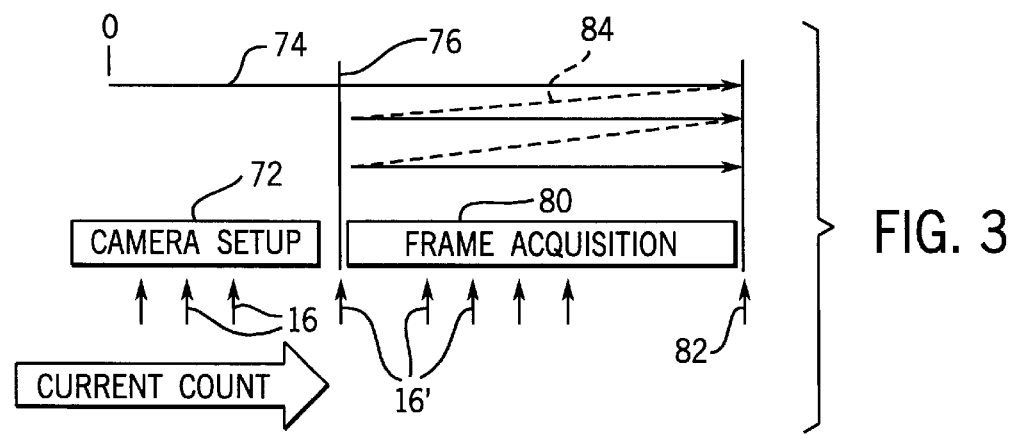
FIG. 3 is pictorial representation of a video acquisition sequence showing the various control and timing signals produced by the timing circuit of FIG. 2 when used with the system of FIG. 1.

Referring now to FIG. 3, the ability to cause a preload of the count generator 48 by use of an operation code 52, and to clear the count generator 48 by use of a restart signal 85 may be used to provide great flexibility in the generation of control and timing signals 16, 32, and 36. When an image acquisition must be synchronized to a process or control system which is not part of the acquisition circuit 15, the control system will assert the restart signal 85. The timing circuit 30 will respond to the restart signal 85 by resetting the count generator 48 to zero.

As the current count from the count generator 48 proceeds from zero, the camera timing signals 16 required during the camera setup period 72 will be output based on the contents of the event memory 46 and current count 50. As the count generator 48 proceeds monotonically through count values as illustrated by arrow 74 it will arrive at a predetermined count value 76 (loaded by the user into the preload register 47), this count value 76 is the end of the camera setup period, and the beginning of the frame acquisition period 80. During the frame acquisition period 80, the timing circuit 30 will generate the timing and control signals 16, 32, and 36 required based on the contents of the event memory 46, and the current count 50.

At the conclusion of the frame acquisition period 80, the operation code 52 activating latches 66(*e*) and 70(*e*), indicated as arrow 82, causes the current count 50 to return to value 76 as indicated by dotted line 84. This cycle will be repeated until another restart signal is received from the process or control system external to the acquisition circuit 15.

Referring now to FIG. 4, the clock signal 40 may also be divided by the state machine 41 to produce a horizontal drive signal 63 being one of the control and timing signals 16 provided to the camera. The horizontal drive signal is used by the camera 12 to synchronize a transmission of a line of video data 18 to the A to D converter 20. The horizontal drive signal 62 may be considered a timing and control signal, but because of its frequency, it is handled simply by a divider circuit within the state machine 41.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A video timing generator for video cameras requiring control and timing signals at multiple predetermined event times during a video scan, the timing generator comprising:

a count generator producing a sequence of current count values at event times;

an event memory holding operation codes associated with target count values;

programming means for programming multiple target count values in the event memory corresponding to the predetermined event times and associated with operation codes for control and timing signals at the multiple predetermined event times;

a scanning circuit scanning through the event memory in between event times to sequentially read-out all of the target count values after each event time;

a comparator receiving at each given event time, in sequence, the read-out target count values and comparing them to a count value of the given event time;

a decoder reading and executing an operation code from the event memory corresponding to read-out target count values matching the given event time as indicated by the comparator to produce at least one control and timing signal.

2. The video timing generator of claim 1 wherein the count generator is synchronized to the acquisition of video data from the video camera.

3. The video timing generator of claim 1 wherein the decoder executes the selected operation code at the next succeeding event time after the comparator indicates the read-out target count value is equal to the current count value.

4. The video timing generator of claim 1 wherein the count generator includes an externally accessible reset line to reset the current count value to zero.

5. The video timing generator of claim 1 wherein the decoder executes at least one operation code by presetting the count generator to a predetermined value.

6. The video timing generator of claim 1 wherein the decoder executes at least one operation code by providing a control and timing signal having a duration equal to a period between successive event times.

7. The video timing generator of claim 1 wherein the decoder executes at least one operation code by producing a predetermined change of state of a control and timing signal at an event time.

8. A video timing generator for video cameras requiring control and timing signals at event times, the timing generator comprising:

a count generator producing a sequence of current count values at event times;

an event memory holding operation codes associated with target count values;

a scanning circuit scanning through the event memory in between event times to read-out the target count values;

a comparator receiving the read-out target count values and comparing them to count values;

a decoder reading and executing selected operation codes from the event memory to produce control and timing signals when the comparator indicates a read-out target count value equals the current count value including a clock signal synchronized to the acquisition of video data from the video camera and wherein the count generator produces current count values as a first quotient of the clock signal, and wherein the scanning circuit produces a scan clock as a second quotient of the clock signal, the scan clock determining a speed of scanning through the event memory.

9. The video timing generator of claim 8 wherein the frequency of the scanning clock equals the frequency of the counts times an integral number no less than a number of target count values that may be stored in the event memory.

10. A video timing generator for video cameras requiring control and timing signals at event times, the timing generator comprising:

a count generator producing a sequence of current count values at event times;

an event memory holding operation codes associated with target count values;

a scanning circuit scanning through the event memory in between event times to read-out the target count values;

a comparator receiving the read-out target count values and comparing them to count values;

a decoder reading and executing selected operation codes from the event memory to produce control and timing signals when the comparator indicates a read-out target count value equals the current count value wherein the decoder executes at least one operation code to de-assert all control and timing signal at an event time.

* * * * *